US009821794B2

(12) United States Patent
Muta et al.

(10) Patent No.: US 9,821,794 B2
(45) Date of Patent: Nov. 21, 2017

(54) HYBRID VEHICLE

(71) Applicant: TOYOTA JIDOSHA KABUSHIKI KAISHA, Toyota-shi, Aichi-ken (JP)

(72) Inventors: Koichiro Muta, Toyota (JP); Hideki Kamatani, Toyota (JP); Takao Itoh, Toyota (JP); Makoto Yamasaki, Toyota (JP); Ryo Mano, Toyota (JP); Masahiro Kagami, Toyota (JP); Hiroki Endo, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 79 days.

(21) Appl. No.: 14/918,885

(22) Filed: Oct. 21, 2015

(65) Prior Publication Data

US 2016/0114791 A1   Apr. 28, 2016

(30) Foreign Application Priority Data

Oct. 22, 2014   (JP) ................................. 2014-215466

(51) Int. Cl.
*B60W 20/16* (2016.01)
*B60K 6/445* (2007.10)
(Continued)

(52) U.S. Cl.
CPC ............. *B60W 20/16* (2016.01); *B60K 6/445* (2013.01); *B60W 10/06* (2013.01); *B60W 10/08* (2013.01);
(Continued)

(58) Field of Classification Search
CPC ........... B60W 20/16; F01N 3/20; F02D 29/02
See application file for complete search history.

(56) References Cited

U.S. PATENT DOCUMENTS

2006/0241826 A1   10/2006   Ishishita et al.
2010/0107608 A1   5/2010   Mitsutani
(Continued)

FOREIGN PATENT DOCUMENTS

EP   2 404 802 A1   1/2012
JP   2004-364371 A   12/2004
(Continued)

OTHER PUBLICATIONS

Robert Bosch GmbH; "Kraftfahr-technisches Taschenbuch, 25. Auflage", Oct. 1, 2003, verlag, XP002755164, ISBN: 3-528-23876-3, pp. 618-619, 664-665.

*Primary Examiner* — Basil T Jos
(74) *Attorney, Agent, or Firm* — Finnegan, Henderson, Farabow, Garrett & Dunner, LLP

(57)   ABSTRACT

When a catalyst temperature is lower than a predetermined temperature on a second or subsequent start of an engine since system activation of a vehicle, a catalyst warm-up request is output for the purpose of warming up a catalyst in a catalytic converter. An output limit Wout of a battery is not increased in response to a second or subsequent output of the catalyst warm-up request, while being increased in response to a first output of the catalyst warm-up request. Accordingly, the catalyst warm-up in response to the second or subsequent output of the catalyst warm-up request since the system activation suppresses excessive output of electric power from the battery and thereby suppresses deterioration of the battery. Catalyst warm-up is performed in response to the second or subsequent output of the catalyst warm-up request. This suppresses deterioration of emission. As a result, this configuration satisfies both (balances) suppression of deterioration of the battery and suppression of deterioration of emission.

7 Claims, 4 Drawing Sheets

(51) Int. Cl.
*F01N 3/20* (2006.01)
*F02D 29/02* (2006.01)
*B60W 10/06* (2006.01)
*B60W 10/08* (2006.01)
*B60W 10/26* (2006.01)
*B60W 20/00* (2016.01)
*B60W 20/40* (2016.01)

(52) U.S. Cl.
CPC ............ *B60W 10/26* (2013.01); *B60W 20/00* (2013.01); *B60W 20/40* (2013.01); *F01N 3/20* (2013.01); *F02D 29/02* (2013.01); *B60W 2530/12* (2013.01); *B60W 2710/06* (2013.01); *B60W 2710/242* (2013.01); *F01N 2240/16* (2013.01); *Y02T 10/54* (2013.01); *Y02T 10/6239* (2013.01); *Y02T 10/6286* (2013.01); *Y10S 903/905* (2013.01)

(56) References Cited

U.S. PATENT DOCUMENTS

| | | | |
|---|---|---|---|
| 2010/0126142 A1* | 5/2010 | Murata | B60K 6/48 60/278 |
| 2013/0030634 A1 | 1/2013 | Endo et al. | |
| 2014/0288736 A1 | 9/2014 | Martin et al. | |

FOREIGN PATENT DOCUMENTS

| | | |
|---|---|---|
| JP | 2007-302185 | 11/2007 |
| JP | 2008-238965 | 10/2008 |
| JP | 2009-214704 A | 9/2009 |
| WO | WO 2011/125184 A1 | 10/2011 |

* cited by examiner

HYBRID VEHICLE

This application claims priority to Japanese Patent Application No. 2014-215466 filed 22 Oct. 2014, the contents of which is incorporated herein by reference.

TECHNICAL FIELD

The present invention relates to a hybrid vehicle and more specifically to a hybrid vehicle equipped with an internal combustion engine, a generator, a motor and a battery.

BACKGROUND ART

A proposed configuration of a hybrid vehicle starts an engine when catalyst temperature in a catalytic converter for the engine during motor-based driving decreases to or below a predetermined temperature that is higher than a lower limit temperature at which action of the catalyst is ensured (for example, JP 2007-3022185A). After a start of the engine, the hybrid vehicle of this configuration controls the engine to drive the hybrid vehicle in response to the driver's request while driving the engine at a drive point that allows for efficient operation of the engine. Such control suppresses the catalyst temperature in the catalytic converter from decreasing to or below the predetermined temperature and thereby suppresses emission of toxic components at a subsequent start of the engine.

CITATION LIST

Patent Literature

Patent Document 1: Japanese Patent Laid-Open No. JP 2007-3022185A

SUMMARY OF INVENTION

Technical Problem

The hybrid vehicle of this configuration, however, starts the engine when the catalyst temperature in the catalytic converter for the engine decreases to or below the predetermined temperature during motor-based driving. Such control aims to keep the catalyst temperature to be not lower than the predetermined temperature. For this purpose, this results in deteriorating the fuel consumption and accelerating deterioration of a battery. In the case that the battery has high state of charge (SOC) and there is only a small distance to a destination, the hybrid vehicle can maintain the motor-based driving even at the decreased catalyst temperature. A start of the engine in this state, however, causes deterioration of the fuel consumption. Frequent start of the engine also leads to frequent charge and discharge of the battery and thereby accelerates deterioration of the battery.

With regard to the hybrid vehicle, an object of the invention is to balance suppression of deterioration of a battery and catalyst warm-up.

Solution to Problem

In order to solve at least part of the problems described above, the hybrid vehicle of the invention may be implemented by the following aspects or configurations.

According to one aspect of the invention, there is provided a hybrid vehicle including: an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the internal combustion engine at a second or subsequent start of the internal combustion engine since the system activation, the controller performs second catalyst warm-up control for catalyst warm-up with applying restrictions compared with the first catalyst warm-up control.

When there is a need to warm up the catalyst in the exhaust emission control device for the internal combustion engine at a first start of the internal combustion engine since the system activation, the hybrid vehicle of this aspect performs the first catalyst warm-up control to warm up the catalyst. When there is a need to warm up the catalyst in the exhaust emission control device for the internal combustion engine at a second or subsequent start of the internal combustion engine since the system activation, the hybrid vehicle of this aspect performs the second catalyst warm-up control to warm up the catalyst with applying restrictions compared with the first catalyst warm-up control. The second catalyst warm-up control with applying the restrictions compared with the first catalyst warm-up control is performed to warm up the catalyst at the second or subsequent start of the internal combustion engine since the system activation. This stabilizes the operation of the internal combustion engine and enables the catalyst warm-up to be completed in a shorter time period. This reduces the charge-discharge amount of the battery accompanied with the catalyst warm-up and thereby suppresses deterioration of the battery. Catalyst warm-up is performed as appropriate at the second or subsequent start of the internal combustion engine. This suppresses deterioration of emission. Additionally, completion of the catalyst warm-up in a short time period at the second or subsequent start of the internal combustion engine suppresses deterioration of the fuel consumption. As a result, this configuration balances suppression of deterioration of the battery and catalyst warm-up.

DESCRIPTION OF EMBODIMENTS

The following describes some aspects of the invention with reference to embodiments.

Embodiment 1

Figure 1:
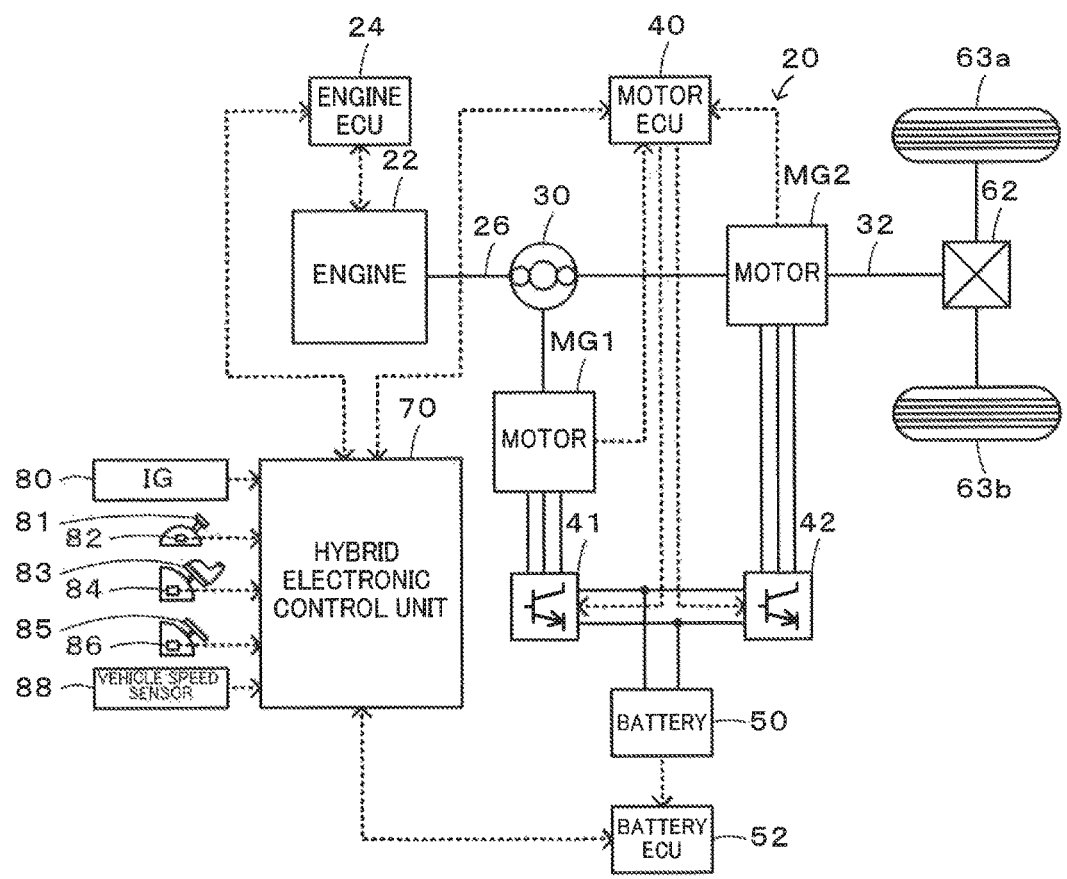
FIG. 1 is a configuration diagram illustrating the schematic configuration of a hybrid vehicle according to a first embodiment of the invention.

FIG. 1 is a configuration diagram illustrating the schematic configuration of a hybrid vehicle 20 according to a first embodiment of the invention. As illustrated, the hybrid vehicle 20 of the first embodiment includes an engine 22 and an engine electronic control unit (hereinafter referred to as engine ECU) 24 that is configured to perform fuel injection control, ignition control and intake air amount control of the engine 22. The hybrid vehicle 20 of the first embodiment also includes a planetary gear 30 configured such that a carrier is connected with a crankshaft 26 as an output shaft of the engine 22 and a ring gear is connected with a driveshaft 32 linked with drive wheels 63a, 63b via a differential gear 62. The planetary gear 30 also includes a sun gear that is connected with a rotor of a motor MG1 configured as, for example, a synchronous motor generator. The driveshaft 32 is connected with a rotor of a motor MG2 configured as, for example, a synchronous motor generator. The motors MG1 and MG2 are driven by inverters 41 and 42. A motor electronic control unit (hereinafter referred to as motor ECU) 40 performs drive control of the motors MG1 and MG2 by switching control of switching elements (not shown) of the inverters 41 and 42. The motors MG1 and MG2 are configured to transmit electric power via the inverters 41 and 42 to and from a battery 50 configured as, for example, a lithium ion secondary battery. The battery 50 is managed by a battery electronic control unit (hereinafter referred to as battery ECU 52 using, for example, a battery voltage Vb, a battery current Ib and a battery temperature Tb. The hybrid vehicle 20 further includes a hybrid electronic control unit (hereinafter referred to as HVECU) 70 configured to control the entire hybrid vehicle 20 by communication with the engine EU 24, the motor ECU 40 and the battery ECU 52.

Figure 2:
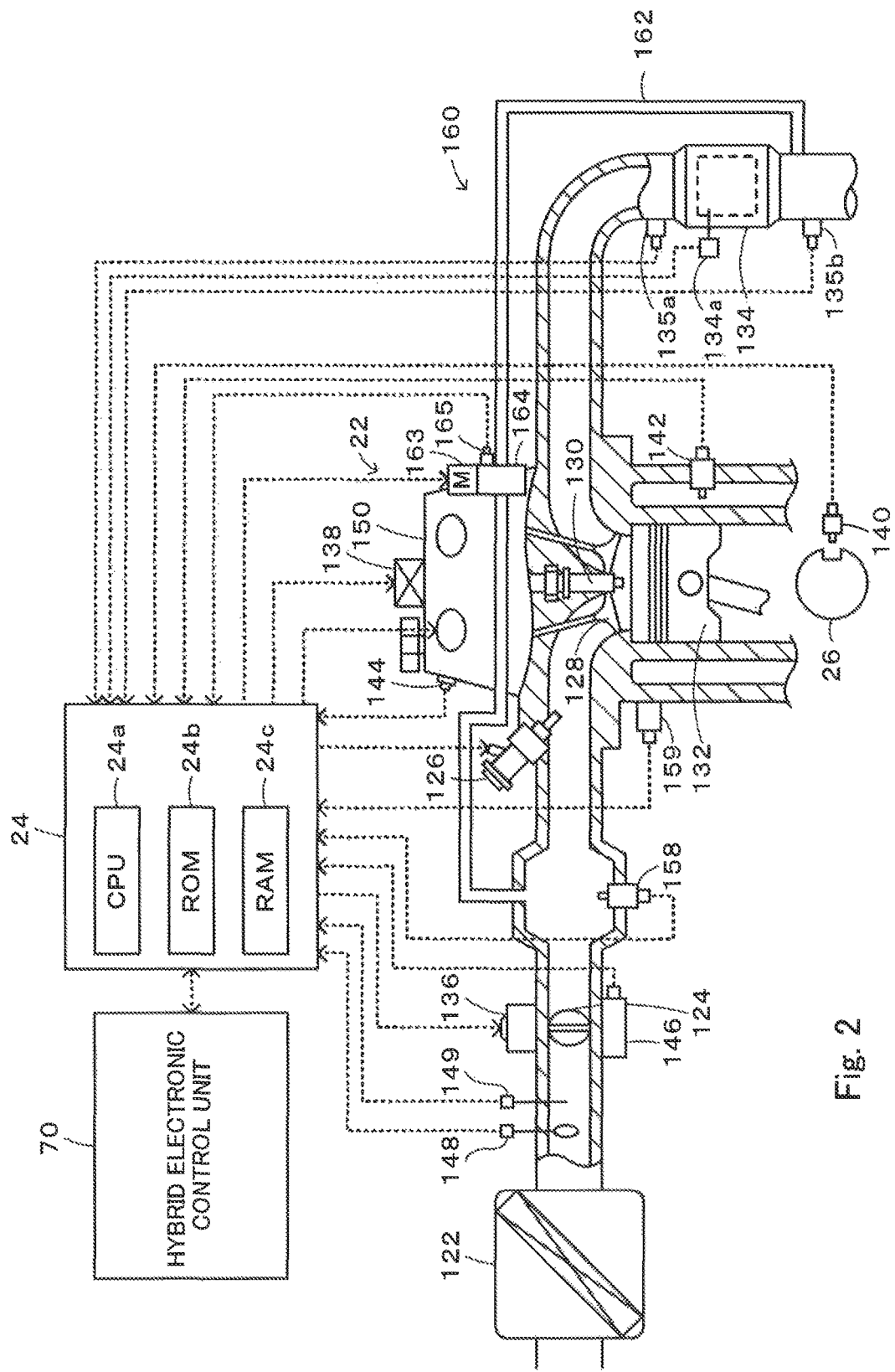
FIG. 2 is a configuration diagram illustrating the schematic configuration of an engine.

The engine 22 is configured as, for example, an engine that outputs power using a hydrocarbon fuel such as gasoline or light oil. As shown in FIG. 2, in the engine 22, the intake air cleaned by an air cleaner 122 is taken in via a throttle valve 124 and is mixed with gasoline injected from a fuel injection valve 126. The air-fuel mixture is sucked into a combustion chamber via an intake valve 128. The sucked air-fuel mixture is explosively combusted by electric spark generated by a spark plug 130. The engine 22 converts the reciprocating motion of a piston 132 pressed down by the energy of explosive combustion into the rotational motion of the crankshaft 26. The exhaust emission from the engine 22 goes through a catalytic converter 134, which is filled with a conversion catalyst (three-way catalyst) to convert toxic components such as carbon monoxide (CO), hydrocarbons (HC) and nitrogen oxides (NOx) to less toxic components, and is discharged to the outside air. The exhaust emission is not fully discharged to the outside air but is partly supplied to the air intake system via an exhaust emission recirculation (EGR) system 160 that recirculates the exhaust emission to the intake air. The EGR system 160 is connected in the downstream of the catalytic converter 134 and includes an EGR pipe 162 configured to supply the exhaust emission to a surge tank of the air intake system and an EGR valve 164 located in the EGR pipe 162 and driven by a stepping motor 163. The recirculated amount of the exhaust emission as uncombusted gas is regulated by adjusting the opening of the EGR valve 164, and the regulated amount of the exhaust emission is recirculated to the air intake system. The engine 22 is configured to suck such mixture of the air, the exhaust emission and gasoline into the combustion chamber.

The engine ECU 24 is implemented by a CPU 24a-based microprocessor and includes a ROM 24b that stores processing programs, a RAM 24c that temporarily stores data, input and output ports (not shown) and a communication port (not shown), other than the CPU 24a. The engine ECU 24 inputs, via its input port, signals from various sensors that are configured to detect the conditions of the engine 22. The signals from the various sensors include a crank position from a crank position sensor 140 configured to detect the rotational position of the crankshaft 26, a cooling water temperature Tw from a water temperature sensor 142 configured to detect the temperature of cooling water of the engine 22, a cam position from a cam position sensor 144 configured to detect the rotational position of a cam shaft provided to open and close the intake valve 128 and an exhaust valve for suction into and discharge from the combustion chamber, a throttle position TH from a throttle valve position sensor 146 configured to detect the position of a throttle valve 124, an intake air flow Qa from an air flowmeter 148 mounted to an intake pipe, an intake air temperature Ta from a temperature sensor 149 mounted to the intake pipe, an intake air pressure Pin from an intake pressure sensor 158 configured to detect the internal pressure of the intake pipe, a catalyst temperature Tc from a temperature sensor 134a mounted to the catalytic converter 134, an air-fuel ratio AF from an air-fuel ratio sensor 135a, an oxygen signal $O_2$ from an oxygen sensor 135b, a knocking signal Ks from a knocking sensor 159 mounted to a cylinder block to detect a vibration induced by the occurrence of knocking, and an EGR valve opening EV from an EGR valve opening sensor 165 configured to detect the opening of the EGR valve 164. The engine ECU 24 outputs, via its output port, various control signals for driving the engine 22. The various control signals include a driving signal to the fuel injection valve 126, a driving signal to a throttle motor 136 configured to adjust the position of the throttle valve 124, a control signal to an ignition coil 138 integrated with an igniter, a control signal to a variable valve timing mechanism 150 configured to vary the open-close timing of the intake valve 128 and a driving signal to a stepping motor 163 configured to adjust the opening of the EGR valve 164. The engine ECU 24 communicates with the hybrid electronic control unit 70 to perform operation control of the engine 22 in response to control signals from the hybrid electronic control unit 70 and output data regarding the operating conditions of the engine 22 as appropriate. The engine ECU 24 computes the rotation speed of the crankshaft 26, which is equal to a rotation speed Ne of the engine 22, based on the crank position from the crank position sensor 140, and computes the intake air amount Qa from the air flowmeter 148.

The motor ECU 40 is implemented by a CPU-based microprocessor and includes a ROM that stores processing programs, a RAM that temporarily stores data, input and output ports and a communication port other than the CPU, although not being illustrated. The motor ECU 40 inputs, via its input port, signals from various sensors required for drive control of the motors MG1 and MG2, for example, rotational positions θm1 and θm2 from rotational position detection sensors configured to detect the rotational positions of rotors of the motors MG1 and MG2 and phase currents applied to the motors MG1 and MG2 and detected by current sensors (not shown). The motor ECU 40 outputs, via its output port, for example, switching control signals to the inverters 41 and 42. The motor ECU 40 communicates with the HVECU 70 to perform drive control of the motors MG1 and MG2 in response to control signals from the HVECU 70 and output data regarding the operating conditions of the motors MG1 and MG2 to the HVECU 70 as appropriate. The motor ECU 40 computes rotation speeds Nm1 and Nm2 of the motors MG1 and MG2, based on the rotational positions θm1 and θm2 of the rotors of the motors MG1 and MG2 from the rotational position detection sensors.

The battery ECU 52 is implemented by a CPU-based microprocessor and includes a ROM that stores processing programs, a RAM that temporarily stores data, input and output ports and a communication port other than the CPU, although not being illustrated. The battery ECU 52 inputs signals required for management of the battery 50, for example, a battery voltage Vb from a voltage sensor (not shown) provided between terminals of the battery 50, a battery current Ib from a current sensor (not shown) mounted to a power line connected with an output terminal of the battery 50 and a battery temperature Tb from a temperature sensor (not shown) mounted to the battery 50. The battery ECU 52 sends data regarding the conditions of the battery 50 to the HVECU 70 by communication as appropriate. The battery ECU 52 computes a state of charge SOC, which denotes a ratio of power capacity dischargeable from the battery 50 to the entire capacity, based on an integral value of the battery current Ib detected by the current sensor, for the purpose of management of the battery 50. The battery ECU 52 also computers input and output limits Win and Wout, which denote maximum allowable powers chargeable into and dischargeable from the battery 50, based on the computed state of charge SOC and the battery temperature Tb.

The HVECU 70 is implemented by a CPU-based microprocessor and includes a ROM that stores processing programs, a RAM that temporarily stores data, a non-transitory flash memory that holds stored data, input and output ports and a communication port other than the CPU, although not being illustrated. The HVECU 70 inputs, via its input port, an ignition signal from an ignition switch 80, a shift position SP from a shift position sensor 82 configured to detect the operational position of a shift lever 81, an accelerator position Acc from an accelerator pedal position sensor 84 configured to detect the depression amount of an accelerator pedal 83, a brake pedal position BP from a brake pedal position sensor 86 configured to detect the depression amount of a brake pedal 85 and a vehicle speed V from a vehicle speed sensor 88. As described above, the HVECU 70 is connected with the engine ECU 24, the motor ECU 40 and the battery ECU 52 via the communication ports to transmit various control signals and data to and from the engine ECU 24, the motor ECU 40 and the battery ECU 52.

The hybrid vehicle 20 of the first embodiment having the above configuration calculates a required torque to be output to the driveshaft 32, based on the vehicle speed V and the accelerator position Acc corresponding to the driver's depression amount of the accelerator pedal 83, and performs operation control or the engine 22, the motor MG1 and the motor MG2 such as to cause a required power corresponding to the calculated required torque to be output to the driveshaft 32. The operation control of the engine 22, the motor MG1 and the motor MG2 has three modes (1) to (3) described below. Both torque conversion operation mode (1) and charge-discharge operation mode (2) are the mode of controlling the engine 22 and the motors MG1 and MG2 such as to output the required power to the driveshaft 32 with operation of the engine 22 and have no significant difference in substantial control. In the description below, these operation modes (1) and (2) may be referred to as engine operation mode (hybrid mode).

(1) torque conversion operation mode: operation mode that performs operation control of the engine 22 such as to cause a power satisfying the required power to be output from the engine 22 and performs drive control of the motor MG1 and the motor MG2 such that all the power output from the engine 22 is subjected to torque conversion by the planetary gear 30, the motor MG1 and the motor MG2 and is output to the driveshaft 32;

(2) charge-discharge operation mode: operation mode that performs operation control of the engine 22 such as to cause a power satisfying a sum of the required power and electric power required to charge the battery 50 or electric power to be discharged from the battery 50, to be output from the engine 22 and performs drive control of the motor MG1 and MG2 such that all the power or part of the power output from the engine 22 with charging or discharging the battery 50 is subjected to torque conversion by the planetary gear 30, the motor MG1 and the motor MG2 and thereby the required power is output to the driveshaft 32; and (3) motor operation mode (EV mode): operation mode that performs operation control such as to cause a power satisfying the required power to be output from the motor MG2 to the driveshaft 32 with operation stop of the engine 22.

Figure 3:
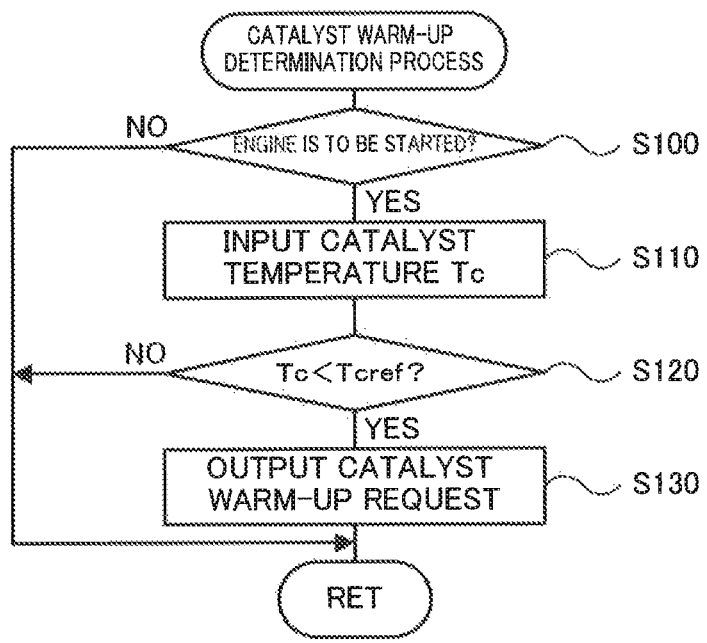
FIG. 3 is a flowchart showing one example of a catalyst warm-up determination process performed by an engine ECU.
Figure 4:
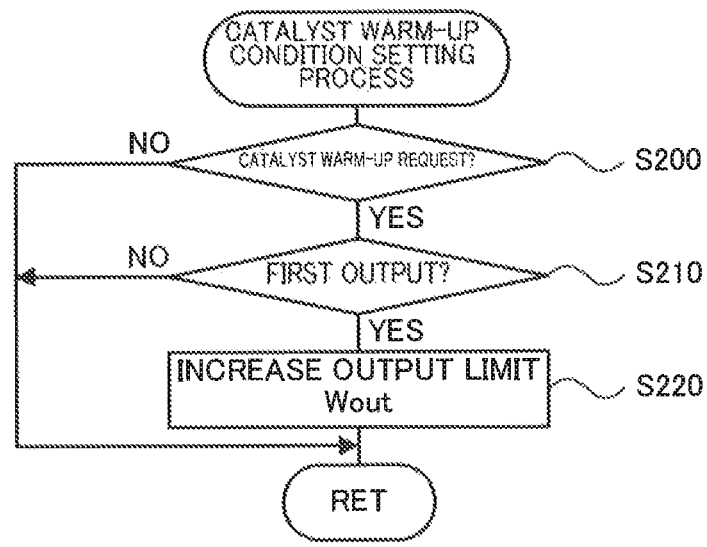
FIG. 4 is a flowchart showing one example of a catalyst warm-up condition setting process performed by the engine ECU.

The following describes the operations of the hybrid vehicle 20 of the first embodiment having the above configuration or more specifically operations to warm up the catalyst in the catalytic converter 134 for a start of the engine 22. FIG. 3 is a flowchart showing one example of a catalyst warm-up determination process performed by the engine ECU 24 to determine whether catalyst warm-up is required. FIG. 4 is a flowchart showing one example of a catalyst warm-up condition setting process performed by the engine ECU 24 to set a condition for catalyst warm-up. The following sequentially describes the catalyst warm-up determination process and the catalyst warm-up condition setting process.

On start of the catalyst warm-up determination process of FIG. 3, the engine ECU 24 first determines whether a start command of the engine 22 is provided (step S100). When the start command of the engine 22 is not provided, the engine ECU 24 determines that catalyst warm-up is not required and immediately terminates this process. When the start command of the engine 22 is provided, on the other hand, the engine ECU 24 inputs the catalyst temperature Tc detected by the temperature sensor 134a (step S110) and determines whether the catalyst temperature Tc is lower than a predetermined temperature Tcset which is specified in advance as temperature for performing catalyst warm-up (step S120). When the catalyst temperature Tc is not lower than the predetermined temperature Tcset, the engine ECU 24 determines that catalyst warm-up is not required and terminates this process. When the catalyst temperature Tc is lower than the predetermined temperature Tcset, on the other hand, the engine ECU 24 determines that catalyst warm-up is required. The engine ECU 24 then outputs a catalyst warm-up request (step S130) and terminates this process. The catalyst warm-up request may be output by, for example, setting a value 1 to a catalyst warm-up request flag.

On start of the catalyst warm-up condition setting process of FIG. 4, the engine ECU 24 first determines whether the catalyst warm-up request is output (step S200). This determination may, for example, check whether the catalyst warm-up request flag is set to the value 1. When the catalyst warm-up request is not output, catalyst warm-up is not performed. The engine ECU 24 accordingly terminates this process without setting the catalyst warm-up condition. When the catalyst warm-up request is output, the engine ECU 24 determines whether the output of the catalyst warm-up request is a first output of the catalyst warm-up request since system activation of the vehicle (step S210). When the output of the catalyst warm-up request is the first output, the engine ECU 24 gives an instruction to increase the output limit Wout of the battery 50 (step S220) and terminates this process. When the output of the catalyst warm-up request is not the first output, on the other hand, the engine ECU 24 terminates this process without giving the instruction to increase the output limit Wout of the battery 50. In response to the instruction to increase the output limit Wout of the battery 50, the HVECU 70 performs drive control (setting a torque command Tm1* of the motor MG1 and a torque command Tm2* of the motor MG2) using a new output limit Wout obtained by increasing the output limit Wout of the battery 50 sent from the battery ECU 52 by a predetermined electric power $\Delta W$. Increasing the output limit Wout of the battery 50 means increasing the maximum electric power that is allowed to be output from the battery 50.

The first catalyst warm-up control since the system activation adjusts the throttle position TH to give a predetermined intake air amount Qa1 that allows for a certain degree of load operation of the engine 22 in a state that the ignition timing of the engine 22 is delayed by a specified delay amount $\Delta\theta 1$ from a reference position, and then increases the output limit Wout of the battery 50 by the predetermined electric power $\Delta W$. The ignition timing of the engine 22 is delayed, with a view to delaying the timing of explosive combustion and causing a greater amount of combustion energy to be included in the exhaust emission, thereby achieving good catalyst warm-up. The load operation of the engine 22 is attributed to the following reason. The delayed ignition timing leads to the slower combustion and is more like to cause a torque variation under non-load operation of the engine 22. The torque variation is likely to cause abnormal noise by rattling of a gear or the like. The load operation of the engine 22 suppresses the likelihood of such abnormal noise. During catalyst warm-up, the power from the engine 22 is not sufficiently used as the power for running. This increases the output from the motor MG2 and thereby requires the greater output from the battery 50. This is the reason why the output limit Wout of the battery 50 is to be increased.

The second or subsequent catalyst warm-up control since the system activation performs the load operation of the engine 22 in a state that the ignition timing of the engine 22 is delayed by a delay amount $\Delta\theta$ from the reference position without increasing the output limit Wout of the battery 50. As described above, the output limit Wout of the battery 50 is not increased in response to the second or subsequent output of the catalyst warm-up request. This suppresses excessive output of electric power from the battery 50 and thereby suppresses deterioration of the battery 50.

In the hybrid vehicle 20 of the first embodiment described above, when the catalyst temperature Tc is lower than the predetermined temperature Tcset on a second or subsequent start of the engine 22 since the system activation of the vehicle, the catalyst warm-up request is output for the purpose of warming up the catalyst in the catalytic converter 134. The output limit Wout of the battery 50 is not increased in response to the second or subsequent output of the catalyst warm-up request since the system activation of the vehicle, while being increased in response to the first output of the catalyst warm-up request. Accordingly, the catalyst warm-up in response to the second or subsequent output of the catalyst warm-up request since the system activation suppresses excessive output of electric power from the battery 50 and thereby suppresses deterioration of the battery 50. Catalyst warm-up is performed in response to the second or subsequent output of the catalyst warm-up request since the system activation. This suppresses deterioration of emission. As a result, this configuration satisfies both (balances) suppression of deterioration of the battery 50 and suppression of deterioration of emission.

The hybrid vehicle 20 of the first embodiment does not increase the output limit Wout of the battery 50 in response to the second or subsequent output of the catalyst warm-up request since the system activation. The requirement is, however, to restrict the increase of the output limit Wout of the battery 50. According to another embodiment, an increase amount of the output limit Wout of the battery 50 may be reduced.

Embodiment 2

The following describes a hybrid vehicle 220 according to a second embodiment of the invention. The hybrid vehicle 220 of the second embodiment has the same configuration as that of the hybrid vehicle 20 of the first embodiment described above with reference to FIGS. 1 and 2, except a difference in catalyst warm-up condition setting process. In order to avoid the duplicated description, the description on the configuration of the hybrid vehicle 220 of the second embodiment is omitted.

Figure 5:
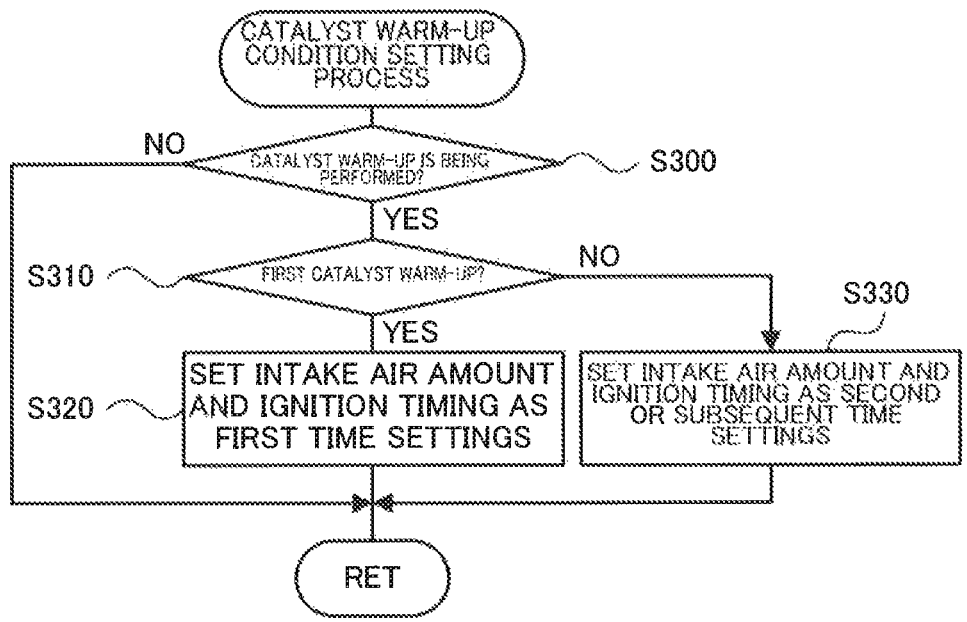
FIG. 5 is a flowchart showing another example of the catalyst warm-up condition setting process performed by the engine ECU according to a second embodiment.

The hybrid vehicle 220 of the second embodiment performs the catalyst warm-up determination process shown in FIG. 3 and performs a catalyst warm-up condition setting process shown in FIG. 5. The following describes the details of the catalyst warm-up condition setting process of FIG. 5.

On start of the catalyst warm-up condition setting process of FIG. 5, the engine ECU 24 of the hybrid vehicle 220 according to the second embodiment first determines whether catalyst warm-up is being performed (step S300). When the catalyst warm-up is not being performed, there is no need to set the catalyst warm-up condition, so that the engine ECU 24 terminates this process. When the catalyst warm-up is being performed, on the other hand, the engine ECU 24 determines whether this time is first catalyst warm-up since system activation of the vehicle (step S310). When this time is the first catalyst warm-up, the engine ECU 24 sets an intake air amount and an ignition timing as the first time settings (step S320) and terminates this process. When this time is not the first catalyst warm-up but is second or subsequent catalyst warm-up since the system activation, on the other hand, the engine ECU 24 sets the intake air amount and the ignition timing as the second or subsequent time settings (step S330) and terminates this process. The ignition timing as the first time setting is a timing delayed by the delay amount $\Delta\theta 1$ from the reference position as described in the first embodiment. The intake air amount as the first time setting is the predetermined intake air amount Qa1 that allows for a certain degree of load operation of the engine 22 as described in the first embodiment. The ignition timing as the second or subsequent time setting is a timing having a restricted delay amount $\Delta\theta$ compared with that of the ignition timing as the first time setting or more specifically a timing that is delayed from the standard ignition timing but is advanced from the ignition timing as the first time setting.

For example, the ignition timing as the second or subsequent time setting may be a timing delayed from the reference position by a delay amount $\Delta\theta 2$ that is smaller than the delay amount $\Delta\theta 1$. The intake air amount as the second or subsequent time setting is an intake air amount Qa2 that allows for a certain degree of load operation of the engine 22 at the ignition timing as the second or subsequent time setting. The ignition timing as the second or subsequent time setting is advanced from the ignition timing as the first time setting. This suppresses the slow combustion and increases the output from the engine 22 at an identical intake air amount. It is accordingly preferable to set a smaller amount to the intake air amount as the second or subsequent time setting compared with the intake air amount as the first time setting. Controlling the ignition timing as the second or subsequent time setting to have a restricted delay amount $\Delta\theta$ compared with that of the ignition timing as the first time setting stabilizes the operation of the engine 22 compared with the first catalyst warm-up and suppresses excessive output from the battery 50, thereby suppressing deterioration of the battery 50.

In the hybrid vehicle 220 of the second embodiment described above, when the catalyst temperature Tc is lower than the predetermined temperature Tcset on a second or subsequent start of the engine 22 since the system activation of the vehicle, the catalyst warm-up request is output for the purpose of warming up the catalyst in the catalytic converter 134. In the second or subsequent catalyst warm-up since the system activation of the vehicle, the employed ignition timing of the engine 22 is delayed from the standard ignition timing but is advanced from the ignition timing of the engine 22 in the first catalyst warm-up. This stabilizes the operation of the engine 22 compared with the first catalyst warm-up and suppresses excessive output from the battery 50, thereby suppressing deterioration of the battery 50. The second or subsequent catalyst warm-up since the system activation suppresses deterioration of emission. As a result, this configuration satisfies both (balances) suppression of deterioration of the battery 50 and suppression of deterioration of emission.

Embodiment 3

The following describes a hybrid vehicle 320 according to a third embodiment of the invention. The hybrid vehicle 320 of the third embodiment has the same configuration as that of the hybrid vehicle 20 of the first embodiment described above with reference to FIGS. 1 and 2, except a difference in catalyst warm-up condition setting process. In order to avoid the duplicated description, the description on the configuration of the hybrid vehicle 320 of the third embodiment is omitted.

Figure 6:
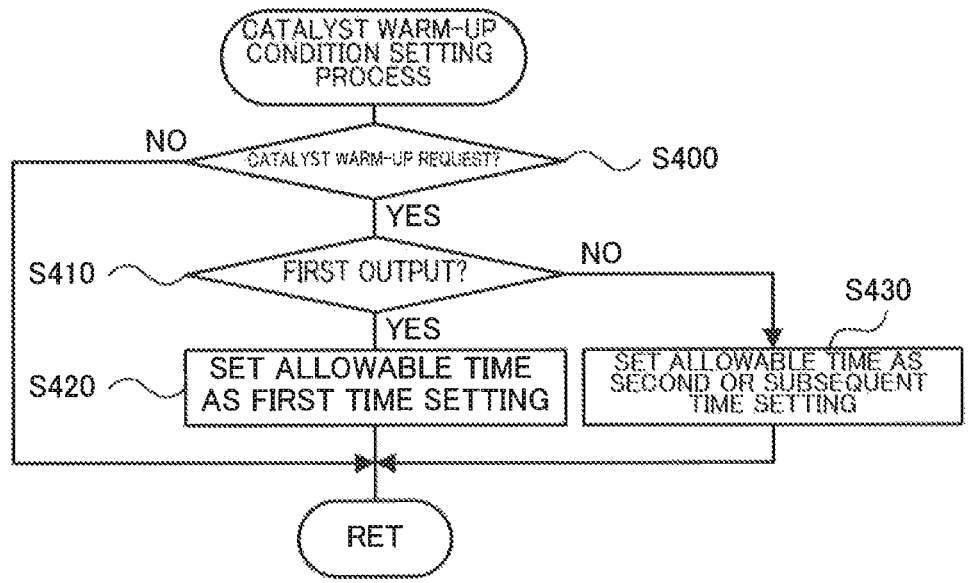
FIG. 6 is a flowchart showing another example of the catalyst warm-up condition setting process performed by the engine ECU according to a third embodiment.

The hybrid vehicle 320 of the third embodiment performs the catalyst warm-up determination process shown in FIG. 3 and performs a catalyst warm-up condition setting process shown in FIG. 6. The following describes the details of the catalyst warm-up condition setting process of FIG. 6.

On start of the catalyst warm-up condition setting process of FIG. 6, the engine ECU 24 of the hybrid vehicle 320 of the third embodiment first determines whether the catalyst warm-up request is output (step S400). When the catalyst warm-up request is not output, there is no need to set the catalyst warm-up condition. The engine ECU 24 accordingly terminates this process immediately. When the catalyst warm-up request is output, the engine ECU 24 determines whether the output of the catalyst warm-up request is a first output of the catalyst warm-up request since system activation of the vehicle (step S410). When the output of the catalyst warm-up request is the first output, the engine ECU 24 sets an allowable time as the first time setting to a maximum time (allowable time) in which catalyst warm-up is allowed to continue (step S420) and terminates this process. When the output of the catalyst warm-up request is not the first output but is a second or subsequent output of the catalyst warm-up request since the system activation, on the other hand, the engine ECU 24 sets a shorter time than the allowable time as the first time setting to an allowable time as the second or subsequent time setting (step S430) and terminates this process. This configuration restricts the allowable time in which catalyst warm-up is allowed to continue when the output of the catalyst warm-up request is the second or subsequent output of the catalyst warm-up request since the system activation. Increasing the time when catalyst warm-up continues leads to increasing the charge-discharge time of the battery 50 accompanied with catalyst warm-up. Accordingly, decreasing the allowable time in which catalyst warm-up is allowed to continue decreases the charge-discharge time of the battery 50 accompanied with catalyst warm-up and thereby suppresses deterioration of the battery 50.

In the hybrid vehicle 320 of the third embodiment described above, when the catalyst temperature Tc is lower than the predetermined temperature Tcset on a second or subsequent start of the engine 22 since the system activation of the vehicle, the catalyst warm-up request is output for the purpose of warming up the catalyst in the catalytic converter 134. In response to the second or subsequent output of the catalyst warm-up request since the system activation of the vehicle, the shorter time than the allowable time in the first output of the catalyst warm-up request is set to the allowable time or the maximum time in which catalyst warm-up is allowed to continue. This shortens the time when catalyst warm-up continues and thereby shortens the charge-discharge time of the battery 50 accompanied with catalyst warm-up, thus suppressing deterioration of the battery 50. Catalyst warm-up is performed in response to the second or subsequent output of the catalyst warm-up request since the system activation. This suppresses deterioration of emission. As a result, this configuration satisfies both (balances) suppression of deterioration of the battery 50 and suppression of deterioration of emission.

The catalyst warm-up condition setting process independently applies restrictions on the increase in output limit Wout of the battery 50 according to the first embodiment, restrictions on the delay amount of the ignition timing of the engine 22 according to the second embodiment and restrictions on the allowable time according to the third embodiment. According to other embodiments, any two of these three restrictions may be used in combination, or all the three restrictions may be used in combination.

In the configurations of the hybrid vehicles 20, 220 and 320 of the first to the third embodiments, the two motors MG1 and MG2 serving as both the generator and the motor are connected with the engine 22 by means of the planetary gear 30. Any other suitable configuration may be employed as long as the configuration includes an engine provided to output power for running, a generator provided to generate electricity by using the power of the engine and a motor provided to output power for running.

In the hybrid vehicle of the above aspect, the first catalyst warm-up control may be control with increasing an output limit that is maximum electric power dischargeable from the battery, and the second catalyst warm-up control may be control with applying restrictions on increasing the output limit compared with the first catalyst warm-up control. During catalyst warm-up, the power from the internal combustion engine is not sufficiently used as the power for running. This increases the output from the motor. Due to the output limit of the battery, however, the battery may fail to output sufficient electric power required for the motor. In order to eliminate the likelihood of insufficient output of the battery, the catalyst warm-up control increases the output limit of the battery and thereby increases the maximum power that may be output from the battery. The second catalyst warm-up control applies restrictions on increasing the output limit of the battery compared with the first catalyst warm-up control. The restrictions applied on increasing the output limit of the battery may be reducing the increase amount of the output limit or providing no increase of the output limit. Applying the restrictions on increasing the output limit of the battery in the second catalyst warm-up control suppresses excessive electric power from being discharged from the battery and thereby suppresses deterioration of the battery. The second catalyst warm-up control also suppresses deterioration of emission after the second or subsequent start of the internal combustion engine.

In the hybrid vehicle of the above aspect, the first catalyst warm-up control may be control with delaying an ignition timing of the internal combustion engine, and the second catalyst warm-up control may be control with applying restrictions on delaying the ignition timing compared with the first catalyst warm-up control. Delaying the ignition timing of the internal combustion engine delays the timing of explosive combustion and causes a greater amount of combustion energy to be included in the exhaust emission. This accelerates catalyst warm-up. The second catalyst warm-up control applies restrictions on delaying the ignition timing of the internal combustion engine compared with the first catalyst warm-up control. The restrictions applied on delaying the ignition timing may be reducing the delay amount of the ignition timing. Applying the restrictions on delaying the ignition timing of the internal combustion engine in the second catalyst warm-up control stabilizes the operation of the internal combustion engine compared with the first catalyst warm-up control and suppresses the excessive output from the battery, thus suppressing deterioration of the battery. The second catalyst warm-up control also suppresses deterioration of emission after the second or subsequent start of the internal combustion engine.

In the hybrid vehicle of the above aspect, the first catalyst warm-up control may be control performed in a range of a first allowable time, and the second catalyst warm-up control may be control performed in a range of a second allowable time that is shorter than the first allowable time. The second catalyst warm-up control applies the restrictions and thereby shortens the allowable time when catalyst warm-up is allowed to continue compared with the first catalyst warm-up control. Increasing the time when catalyst warm-up continues leads to increasing the charge-discharge time of the battery accompanied with catalyst warm-up. Accordingly, decreasing the allowable time in which catalyst warm-up is allowed to continue decreases the charge-discharge time of the battery accompanied with catalyst warm-up. As a result, this suppresses deterioration of the battery. The second catalyst warm-up control also suppresses deterioration of emission after the second or subsequent start of the internal combustion engine.

The aspect of the invention is described above with reference to the embodiment. The invention is, however, not limited to the above embodiment but various modifications and variations may be made to the embodiment without departing from the scope of the invention.

INDUSTRIAL APPLICABILITY

The present invention is applicable to, for example, manufacturing industries of hybrid vehicles.

The invention claimed is:

1. A hybrid vehicle, comprising an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the internal combustion engine at a second or subsequent start of the internal combustion engine since the system activation, the controller performs second catalyst warm-up control for catalyst warm-up with applying restrictions compared with the first catalyst warm-up control, wherein the first catalyst warm-up control is control with increasing an output limit that is maximum electric power dischargeable from the battery, and the second catalyst warm-up control is control with applying restrictions on increasing the output limit compared with the first catalyst warm-up control.

2. A hybrid vehicle, comprising an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the Internal combustion engine at a second or subsequent start of the internal combustion engine since the system activation, the controller performs second catalyst warm-up control for catalyst warm-up with applying restrictions compared with the first catalyst warm-up control, wherein the first catalyst warm-up control is control with delaying an ignition timing of the internal combustion engine, and the second catalyst warm-up control is control with applying restrictions on delaying the ignition timing compared with the first catalyst warm-up control.

3. A hybrid vehicle, comprising an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the internal combustion engine at a second or subsequent start of the internal combustion engine since the system activation, the controller performs second catalyst warm-up control for catalyst warm-up with applying restrictions compared with the first catalyst warm-up control, wherein the first catalyst warm-up control is control performed in a range of a first allowable time, and the second catalyst warm-up control is control performed in a range of a second allowable time that is shorter than the first allowable time.

4. A hybrid vehicle, comprising an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the internal combustion engine at a second or subsequent start of the internal combustion engine since the system activation, the controller performs second catalyst warm-up control for catalyst warm-up with applying restrictions compared with the first catalyst warm-up control, wherein the first catalyst warm-up control is control with increasing an output limit that is maximum electric power dischargeable from the battery and with delaying an ignition timing of the internal combustion engine, and the second catalyst warm-up control is control with applying restrictions on increasing the output limit compared with the first catalyst warm-up control and with applying restrictions on delaying the ignition timing compared with the first catalyst warm-up control.

5. A hybrid vehicle, comprising an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the internal combustion engine at a second or subsequent start of the internal combustion engine since the system activation, the controller performs second catalyst warm-up control for catalyst warm-up with applying restrictions compared with the first catalyst warm-up control, wherein the first catalyst warm-up control is control which is performed with increasing an output limit that is maximum electric power dischargeable from the battery and which is performed in a range of a first allowable time, and the second catalyst warm-up control is control which is performed with applying restrictions on increasing the output limit compared with the first catalyst warm-up control and which is performed in a range of a second allowable time that is shorter than the first allowable time.

6. A hybrid vehicle, comprising an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the internal combustion engine at a second or subsequent start of the internal combustion engine since the system activation, the controller performs second catalyst warm-up control for catalyst warm-up with applying restrictions compared with the first catalyst warm-up control, wherein the first catalyst warm-up control is control which is performed with delaying an ignition timing of the internal combustion engine and which is performed in a range of a first allowable time, and the second catalyst warm-up control is control which is performed with applying restrictions on delaying the ignition timing compared with the first catalyst warm-up control and which is performed in a range of a second allowable time that is shorter than the first allowable time.

7. A hybrid vehicle, comprising an internal combustion engine that is configured to output power for running, a generator that is configured to generate electricity with the power of the internal combustion engine, a motor that is configured to output power for running, a battery that is configured to transmit electric power to and from the generator and the motor, and a controller that is configured to perform first catalyst warm-up control for catalyst warm-up when there is a need for warm-up of a catalyst in an exhaust emission control device for the internal combustion engine at a first start of the internal combustion engine since system activation, wherein when there is a need for warm-up of the catalyst in the exhaust emission control device for the internal combustion engine at a second or subsequent start of the internal combustion engine since the system activation, the controller performs second catalyst warm-up control for catalyst warm-up with applying restrictions compared with the first catalyst warm-up control, wherein the first catalyst warm-up control is control which is performed with increasing an output limit that is maximum electric power dischargeable from the battery and with delaying an ignition timing of the internal combustion engine and which is performed in a range of a first allowable time, and the second catalyst warm-up control is control which is performed with applying restrictions on increasing the output limit compared with the first catalyst warm-up control and with applying restrictions on delaying the ignition timing compared with the first catalyst warm-up control and which is performed in a range of a second allowable time that is shorter than the first allowable time.

* * * * *